(No Model.) 2 Sheets—Sheet 2.
J. J. FETZER.
FIFTH WHEEL COUPLING FOR VEHICLES.
No. 492,719. Patented Feb. 28, 1893.
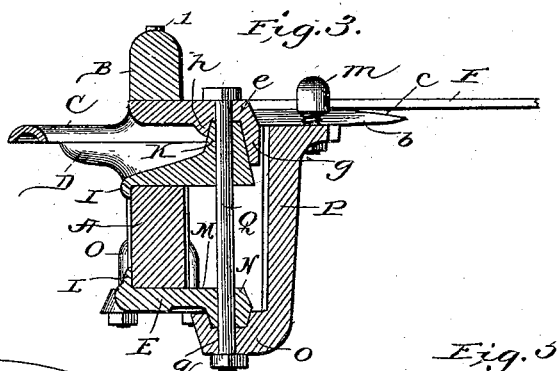
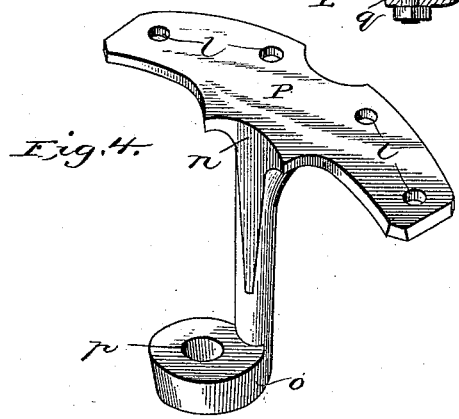
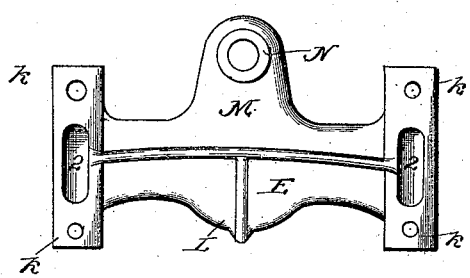
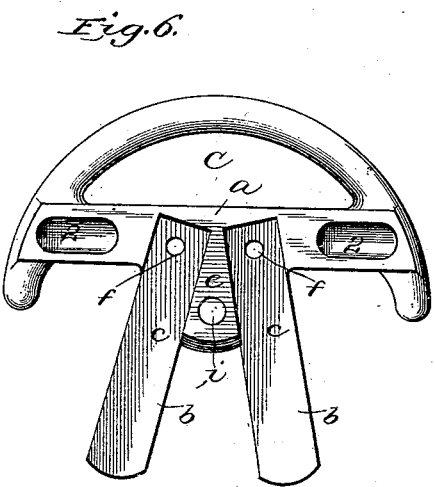
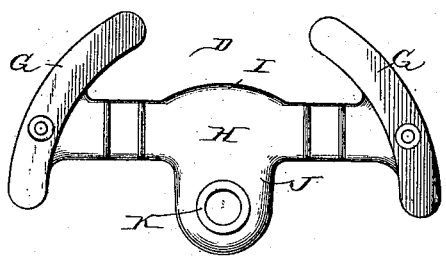

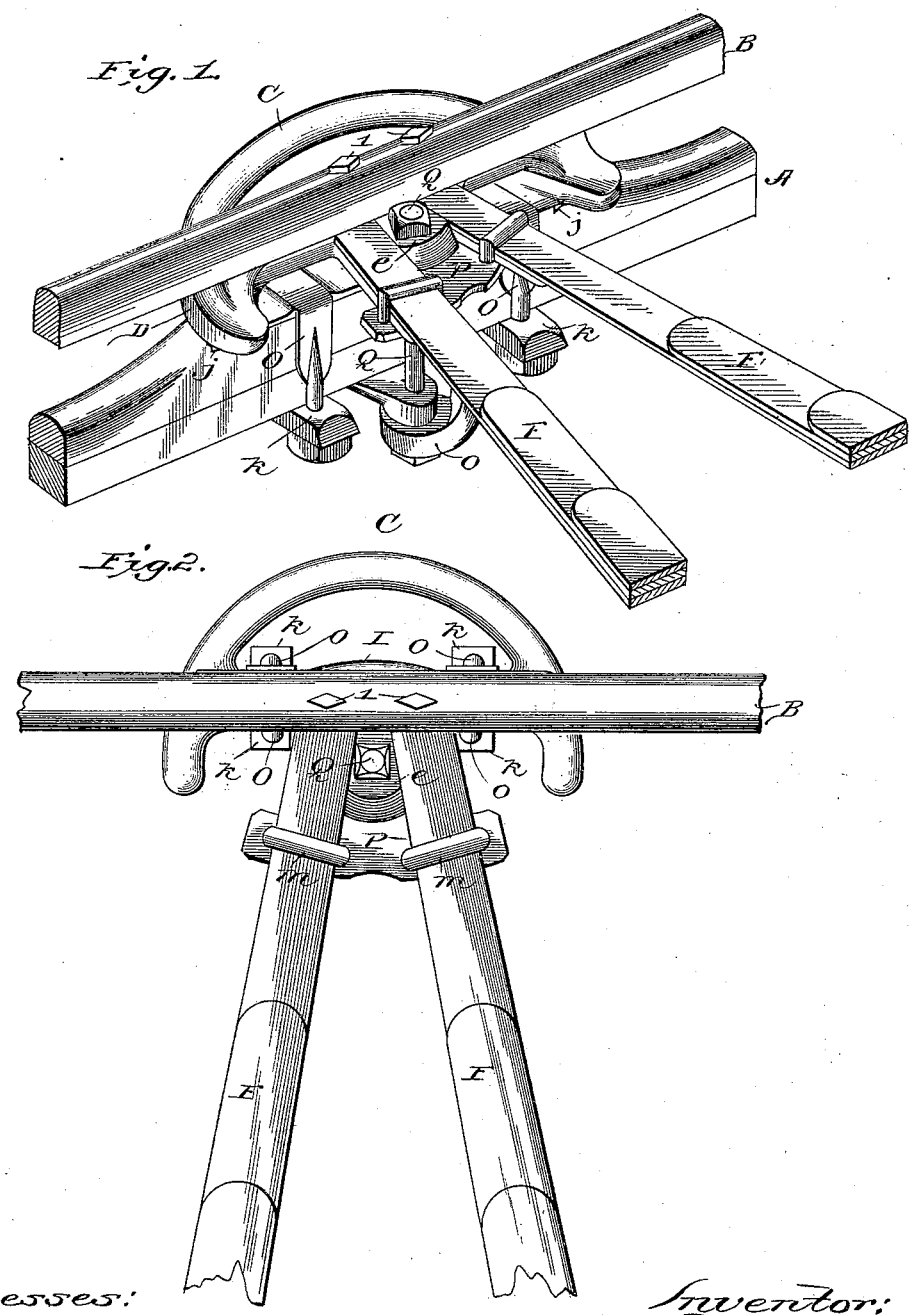

UNITED STATES PATENT OFFICE.

JAMES J. FETZER, OF COLUMBIANA, ASSIGNOR TO THE HERBRAND COMPANY, OF FREMONT, OHIO.

FIFTH-WHEEL COUPLING FOR VEHICLES.

SPECIFICATION forming part of Letters Patent No. 492,719, dated February 28, 1893.

Application filed September 8, 1892. Serial No. 445,331. (No model.)

*To all whom it may concern:*

Be it known that I, JAMES J. FETZER, a citizen of the United States, residing at Columbiana, in the county of Columbiana and State of Ohio, have invented certain new and useful Improvements in Running-Gear for Vehicles; and I do hereby declare the following to be a full, clear, and exact description of the invention, such as will enable others skilled in the art to which it appertains to make and use the same.

My invention relates, broadly stated, to improvements in running gear for vehicles, having particular reference to the construction of a staunch, compact, interlocking fifth-wheel of the rear king-bolt type, such as exemplified by Letters Patent of the United States, numbered 277,725, granted May 15, 1883, to The Herbrand Company of Fremont, Ohio.

The present invention has for its special object, the production of a wheel, the respective members of which are at once light, strong, cheap in construction, and capable of being so assembled as to be entirely safe and effective even in the absence of a king-bolt proper; and as a further object I have in view the adaptation of said wheel to the running gear covered by United States Letters Patent No. 436,344, granted to me September 16, 1890.

The invention will be hereinafter described and particularly pointed out in the claims.

In the accompanying drawings which form part of this specification: Figure 1, represents a rear view of my invention in perspective. Fig. 2, a top plan view thereof, Fig. 3, a longitudinal central section. Fig. 4, a detached perspective view showing a brace for connecting the spring-irons and axle-plate. Fig. 5, a bottom view of the axle-plate also detached. Fig. 6, a plan view of top-plate, and Fig. 7, a similar view of the bottom-plate.

Reference being had to the drawings and letters thereon, A represents the axle; B the head-block or bolster; C the top and D the bottom fifth-wheel plates; E the axle-plate; and F F body springs, said parts (springs excepted) being preferably made of malleable and wrought metal.

Top-plate C is conveniently made semi-circular in form, its ends being connected by the usual bridge or bolster-support *a*, integral with which are formed rearwardly extending arms *b b* of uniform width, length and thickness, the surfaces *c c* thereof being depressed or lowered with relation to the bolster-plate *a*, and also tapered or reduced slightly toward their outer ends as at *d* Fig. 3 for purposes that will hereinafter appear. From the center of said bolster-plate *a*, extends also a rearward projection *e*, the surface of which is in the same plane with that of the plate *a*; and, being thus higher than the surfaces *c c* of adjacent arms *b b*, forms one wall of chambers *f f* extending part way across the plate *a*, as shown in Fig. 6, for the purpose of receiving and pocketing the front end of springs F F. Projection *e* terminates in a downwardly extending boss *g* for protecting the pivotal parts when the wheel is in use, and assisting to retain them in their relative positions. Immediately in front of the boss *g* projection *e* is recessed as at *h*, and in the center of said recess the metal above is perforated as at *i* for the reception of a king-bolt.

The bottom-plate D consists of lugs or rub irons G, G and connecting plate H resting when in use upon the top of axle A; said plate being provided at its front center with a lip I for overlapping the axle, and small end lugs *j j* for steadying the plate thereon, while from the rear center of plate H is a projection J, bearing a perforated cone K, to be received by recess *h* of the top-plate when these parts are properly assembled.

The axle-plate E has a lip L, similar to that marked I on the bottom-plate and for a similar purpose; while directly opposite is a projection M bearing a perforated cone N, corresponding with parts J, K, of the bottom plate, except that the cone extends downward. This axle plate as will be seen by inspection of Fig. 1, is less in length than the diameter of the wheel, and is provided with right-angular extensions *k, k*, at its ends, projecting over the sides of the axle A, where they are drilled for the reception of saddle clips O, O, used in securing the plates to the axle.

P indicates a brace-iron substantially T-shaped, drilled as at *l, l, l, l* and, together with springs F F, firmly secured to arms *b b* of the top-plate by clips *m m*, the front top edge *n* of said brace being dished to correspond with the configuration of boss $g$, on the top-plate, against which it rests. Brace P descending is provided at its lower end with an angular enlargement $o$ having a conical recess $p$, to receive cone N, while the metal immediately beneath said recess is perforated as at $q$ for the reception of a king-bolt Q.

In assembling the respective parts thus substantially described, the top-plate is secured to bolster B by bolts $l$, $l$, passing through both, as also through springs F F interposed between the two in the channels $f$ $f$, and in addition to this, if desired, the plate and bolster may be further secured by screws passing through from below. The bottom and axle plates D and E located above and below the axle respectively are secured mainly by the saddle-clips O O, as clearly illustrated by Fig. 1. The former being provided with upwardly extending perforated boss K and the latter with a similar one, N, extending downward it is apparent that the two combined form a pivot, the equivalent of a rear king-bolt, the upper end of which (K) bears in recess $h$ of the top-plate and is there retained by the brace-iron P, which affords a bearing $p$ for the opposite end (N) of said pivot, and when properly drawn up by action of clips $m$, $m$, so firmly interlocks the parts that the king-bolt might be lost or dispensed with and the effectiveness of the combination in no wise impaired.

It is obvious from an inspection of the drawings that the various parts of my improved wheel are lightened and reduced in weight at all points consistent with safety and durability as at 2, 2, Fig. 6 for example.

The object of tapering or diminishing the thickness of arms $b$, $b$, as at $d$, is to facilitate vibration of the springs F F resting thereon, these arms however, may, if desired, be made of one uniform thickness, and likewise many minor changes can be made in the construction and arrangement of parts without in the least departing from the spirit of my invention, which—

Having been thus fully described, what I claim is as follows:

1. In a fifth-wheel, the combination with a bottom-plate, of a top-plate having a recess or seat beneath the bolster for the end of the spring or reach, a brace adapted to support and secure the spring or reach at a point back of the end which rests on the top-plate, and a king-bolt connecting the plates.

2. In a running-gear for vehicles, the combination of an axle, head-block, body springs or reach, bottom-plate, top-plate having depressions therein beneath the head block to receive the ends of said springs or reach, and a king-bolt connecting the plates.

3. In a running-gear for vehicles, an axle, head-block, body springs, bottom-plate, and a top-plate having transverse depressions therein beneath the head block to receive the ends of said springs, and rearwardly extending spring supporting arms contiguous therewith; in combination with a king-bolt connecting the plates in rear of the axle.

4. In a running-gear for vehicles, an axle, head-block, body-springs, bottom-plate, and a top-plate having transverse depressions to receive the ends of the springs and rearwardly extending tapering arms for supporting and facilitating vibrations of said springs; in combination with a king-bolt connecting the plates in rear of the axle.

5. In a running-gear for vehicles, an axle, head-block, bottom-plate, axle-plate, top-plate pivoted upon the bottom-plate in rear of the axle and provided with spring or reach-arms; in combination with an interlocking brace extending from said arms and pivoted beneath the axle-plate at a point in rear of the axle, and a king-bolt piercing said top-plate, bottom-plate, axle-plate and brace.

6. In a running-gear for vehicles, an axle, head-block, bottom-plate bearing a rearwardly extending upturned apertured pivot, an axle-plate having a similar downwardly turned pivot, and a top-plate having a rearwardly projecting recessed boss receiving the bottom-plate-pivot and diverging spring or reach irons; in combination with an interlocking brace extending from said arms and terminating in a recessed perforated boss receiving the axle-plate-pivot, and a king-bolt piercing said plates and brace.

In testimony whereof I subscribe my signature in presence of two witnesses.

JAMES J. FETZER.

Witnesses:
W. G. STRICKLER,
D. M. McGOFFICK.